Nov. 26, 1963  J. T. SIMMONS  3,111,752
PRESS FOR AUTOMOTIVE SERVICE
Filed Oct. 27, 1959  2 Sheets-Sheet 2

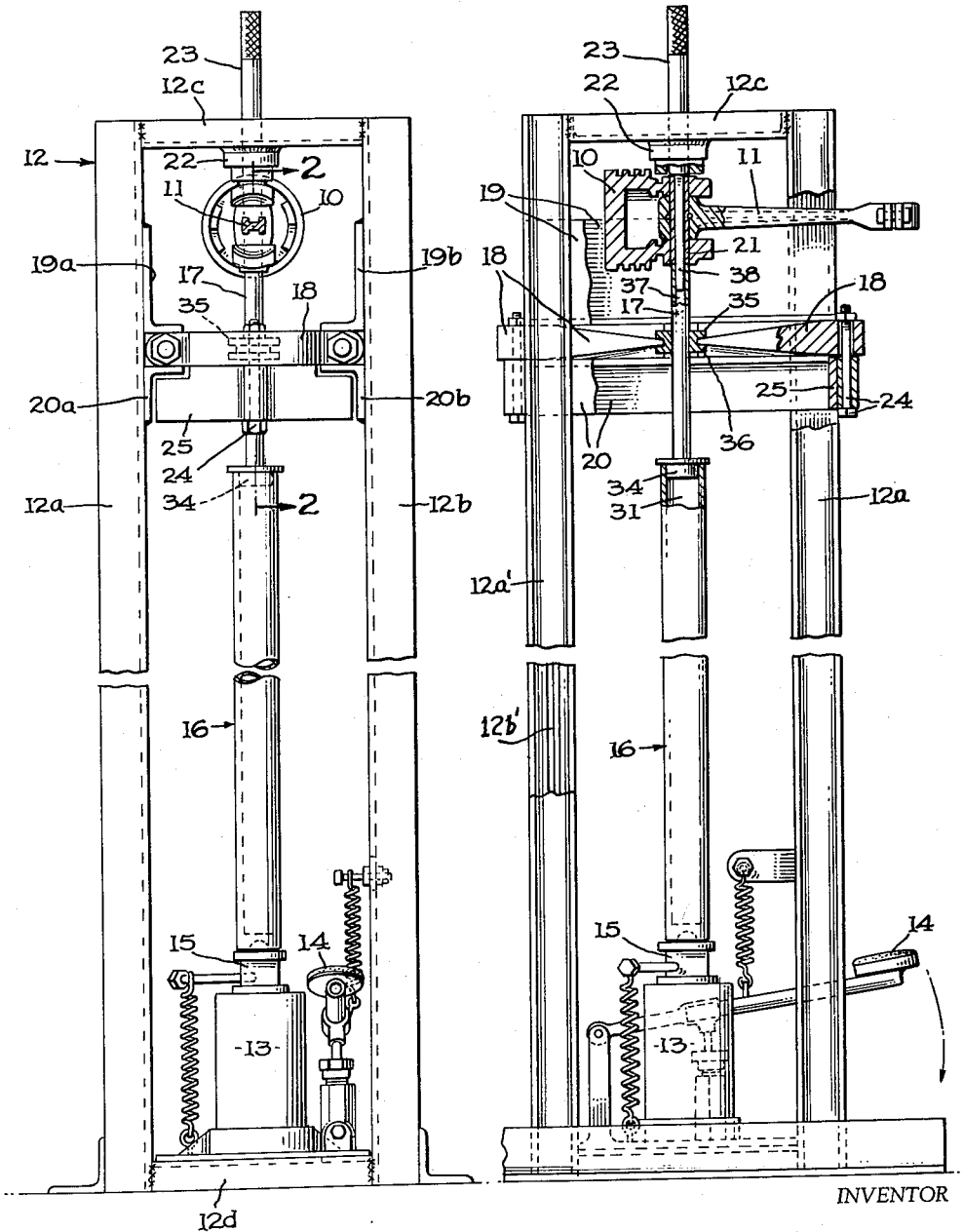

INVENTOR
JESSE THOMAS SIMMONS
BY Ralph B. Stewart
ATTORNEY

United States Patent Office 3,111,752
Patented Nov. 26, 1963

3,111,752
PRESS FOR AUTOMOTIVE SERVICE
Jesse Thomas Simmons, 601 N. Maine St.,
Chattanooga, Tenn.
Filed Oct. 27, 1959, Ser. No. 848,980
4 Claims. (Cl. 29—252)

The present invention relates to presses designed for assembling and disassembling inter-fitting parts and has particular reference to an improved press for installation and removal of press-fitted parts in their mountings.

Perhaps the outstanding advantage of the new device resides in the safe and efficient operation for the general purpose of combining and separating of press-fitted parts such as the pressing of rear axle bearings off and onto the axle, the removing and installing of press-fit piston pins, and the servicing of universal joints.

With this invention it is possible to provide a machine that may be quickly changed from a setting allowing it to perform one operation to a new arrangement allowing it to service a different type of item.

In the servicing of automobile parts, especially where parts are being assembled or disassembled under considerable pressure, it is a rather common experience that certain parts, especially hardened steel parts, will break under the applied pressure and fragments of the broken parts will be thrown out in all directions under considerable force sufficient to cause serious injury to the operator.

The invention seeks to provide a novel pressing device which is directed to protecting the operator against such injury much more than any existing device of this type.

In this new form of press, bearings are installed by pressing them on the axle by means of a tube. By the use of tubing in the manner of this invention, only the cone of the bearing has any pressure applied to it. Prior methods whereby pressure is exerted on the race tends to distort or break the bearing but by applying pressure to the cone as with the apparatus of this invention, no harm is done to the bearing.

Since a wide use is made of press-fit piston pins, especially in the automotive industry, the present invention is also directed to a device to press these pins in or out without allowing the piston to roll enough to cause breakage.

Furthermore, being foot-operated, the device of this invention frees the operator's hands for positioning the work in the press, allowing him to turn out more work with less expenditure of time.

These as well as further advantages which are inherent in the invention will become apparent from the following description, reference being had to the accompanying drawings wherein:

FIGURE 1 is a front elevation view of the device of this invention as used for piston pin servicing.

FIGURE 2 is a side view partly in elevation and partly in cross-section as seen substantially on line 2—2 of FIGURE 1.

Figure 3:
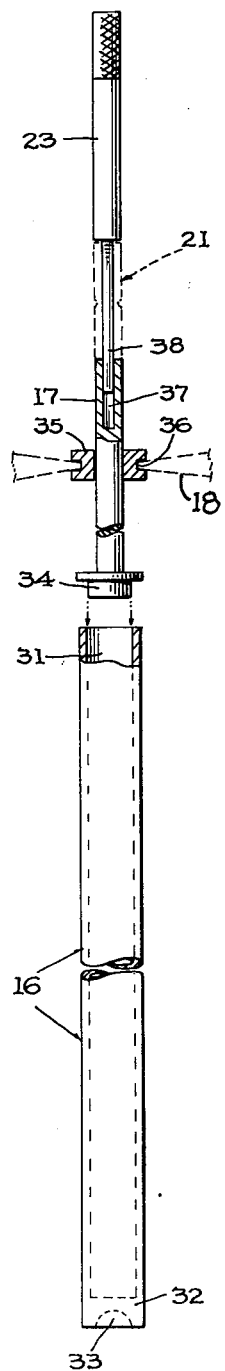
FIGURE 3 is a detail view of a guide rod and a pushing tool used with the invention with a detail view of a pusher tube also used with the invention.

In FIGURES 1 and 2 my novel pressing apparatus is illustrated as applied to one of the many services it can be used to perform. As shown, the press is arranged to accommodate a piston 10 and connecting rod 11 in order to remove or install a piston wrist pin 21 used to attach these engine parts to each other. The press is provided with a rectangular frame 12 formed of two or more parallel tension members 12a, 12b joined at the top ends by an upper cross-head 12c and at the bottom ends by a lower cross-head 12d. In the example shown in the drawing, four channel-iron tension bars 12a, 12a', 12b and 12b' form the vertical corners of the frame, but bars 12a and 12a' may be replaced by a single channel bar and 12b and 12b' replaced by a single channel bar. Supported on lower cross-head 12d is a hydraulic jack 13 operated by foot pedal 14. Another type jack may work equally well but a hydraulic jack is used here for purposes of illustration. The ram 15 of hydraulic jack 13 exerts a force upward against pusher tube 16 which in turn forces pushing tool 17 upward against piston wrist pin 21 to push pin 21 into or out of the position shown, as desired. Pushing tool 17 is supported laterally and is guided vertically by pilot ring 35 carried by pulling plates 18 which are held in position between pairs of brackets 19a—20a and 19b—20b mounted on the tension bars 12a—12a' and 12b—12b'. These brackets may be formed of lengths of angle-iron, as shown. The horizontal flanges on each pair of brackets 19a—20a and 19b—20b form a horizontal guide channel arranged transversely of the tension members supporting each pair, and the two horizontal guide channels are arranged in opposed relation, that is, the open sides of the two channels face each other. Opposing the force of pushing tool 17 is an anvil 22 welded to the lower face of upper cross-head 12c. A guide rod 23 extends through an opening in cross-head 12c and through a center bore in anvil 22. A reduced portion 38 of rod 23 extends through piston pin 21 in piston 10 and connecting rod 11, and enters a bore 37 in the upper end of pushing tool 17. Rod 23 thereby provides lateral support and steadying of the workpieces, in this case wrist pin 21, piston 10 and connecting rod 11.

FIGURE 3 shows in detail the construction of pusher tube 16, pushing tool 17, and guide rod 23, illustrating their use as shown in FIGURES 1 and 2. Pusher tube 16 has a bore 31 of a size capable of receiving a work piece such as an automobile axle when necessary, and a closed bottom 32. Bottom 32 is solid except for a conical or hemispherical hole 33 used to center tube 16 over a steel ball 61 (FIGURE 6) located in the top of jack ram 15. When used with pushing tool 17, the flanged head 34 at the lower end of pushing tool or rod 17 fits within the bore 31 of pusher tube 16. By this means, the upward motion of pusher tube 16 forces pushing tool 17 upward through pilot ring 35. Pilot ring 35 has a groove 36 extending around its periphery by which pulling plates 18 grip it and hold it in a stationary position during pressing operations. The upper part of pushing tool 17 has a hollow center 37 into which the reduced end portion 38 of guide rod 23 fits after passing through piston pin 21 or other workpiece.

Pushing rod 17 is of a slightly smaller diameter than the wrist pin so that in pushing a pin out of a piston, the pushing rod slides freely into the wrist pin bore of the piston and drives the wrist pin into the bore of anvil 22, the anvil bore being larger in diameter than the wrist pin. The pilot rod 23 is pushed along with wrist pin 21 and both pins are removed from the top of the press as soon as pin 21 has been pushed out of the piston.

In replacing a wrist pin in a piston, the pilot rod 23 is lowered into the anvil bore so that its enlarged portion may pass entirely through the piston 10. The piston and connecting rod 11 are then placed on rod 23, and the new wrist pin is placed on the reduced end portion 38 of rod 23 which extends below the piston. Then pushing rod 17 is raised until it engages the lower end of wrist pin 21 and the pin portion 38 enters the bore 37 of rod 17, see FIGURE 3. Continued upward movement of rod 17 will drive the pin 21 into the wrist pin bore of piston 10.

If desired, a separate pilot pin may be used for replacing a new wrist pin, from that used in removing an old wrist pin. The replacement pilot pin would have three sections of different diameters, an upper section of largest diameter to fit snugly in the anvil bore, a middle section of smaller diameter to fit snugly in the wrist pin bore of the piston and of a length to extend through the piston, and an end section of smaller diameter to fit snugly in the central bore of the wrist pin.

Figure 4:
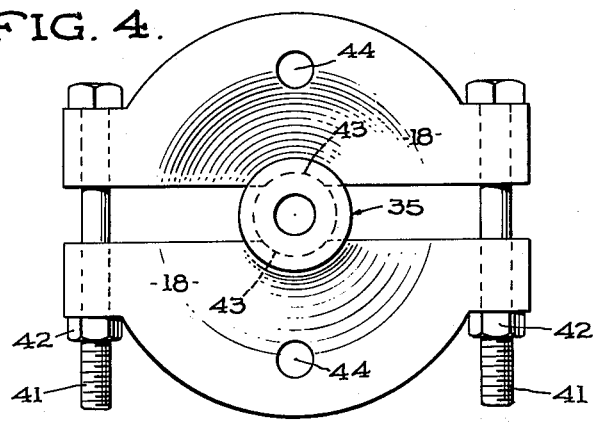
FIGURE 4 is a plan view of the pulling plates which are used with the press for certain operations.
Figure 5:
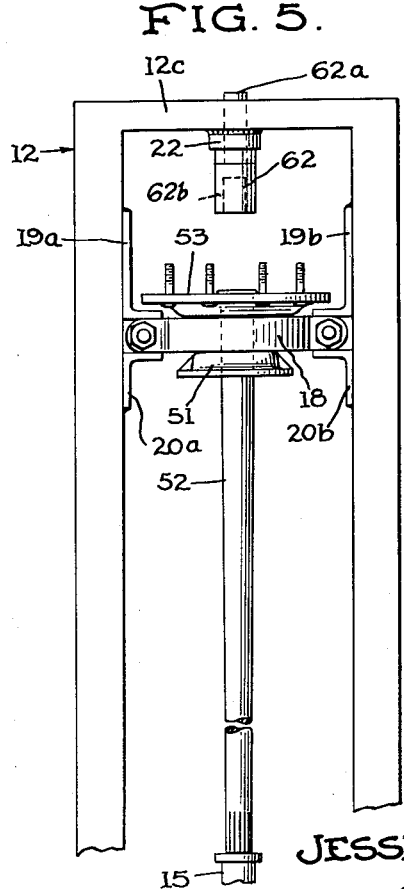
FIGURES 5 and 6 show the device of the invention used for the removal and installation of bearings on an axle.

FIGURE 4 is a detail view of pulling plates 18 which may be used to clamp pilot ring 35 in position or for pulling bearings as disclosed in FIGURE 5. Held between support brackets 19 and 20, the whole pulling plate assembly of FIGURE 4 is easily removed when not needed in the operation of the press. The distance between the plates 18 is easily adjustable by means of bolts 41 and nuts 42. Notches 43 in adjacent edges of plates 18 form an aperture for receiving the pilot ring 35, or a workpiece or pushing part. These notches ensure accurate location of pilot ring 35 or a workpiece located in the aperture as necessary. Plates 18 taper from a maximum thickness of about 1¼″ at their outer edges to a minimum thickness of ¼ inch or less where they grip pilot ring 35. Holes 44 receive bolts 24 which are used to attach and hold guards 25 in place.

Attached to pulling plates 18 by means of bolts 24 are guards 25 located on both the front and back of frame 12. The guards 25 are removable when special pressing jobs make this necessary. However, they provide positive protection to the operator while performing jobs such as pressing bearing off axles, pinions, transmission parts, and other similar operations. In additions, the arrangement of the guards 25 helps to prevent pulling plates 18 from breaking or bending under ordinary pressing conditions.

In FIGURE 5 another arrangement of the pressing device is illustrated showing how it is used to remove a bearing 51 from an axle 52. Although this is definitely a use of the machine when the protection of guards 25 would be necessary, they are not shown in this figure in order to allow clearer illustration of the use of the press. In the operation shown, the pulling plates 18 are clamped together in the space between the bearing 51 and the axle flange 53, and this is possible because of the inwardly tapering shape of plates 18. The axle 52, which acts as a pushing part, passes through the aperture formed by notches 43 in plates 18. These plates are clamped wide enough apart so as not to clamp the axle 52 but extend over the ball race on the cone of bearing 51. Jack ram 15 is then raised, forcing axle 52 upward while bearing 51 is prevented from moving in that direction by pulling plates 18. The bearing 51 may thereby be removed from axle 52 with ease, and injury from possible breaking of the bearing is prevented by guard plates 25 which extend downwardly from plates 18 to below the level of bearing 51.

Figure 6:
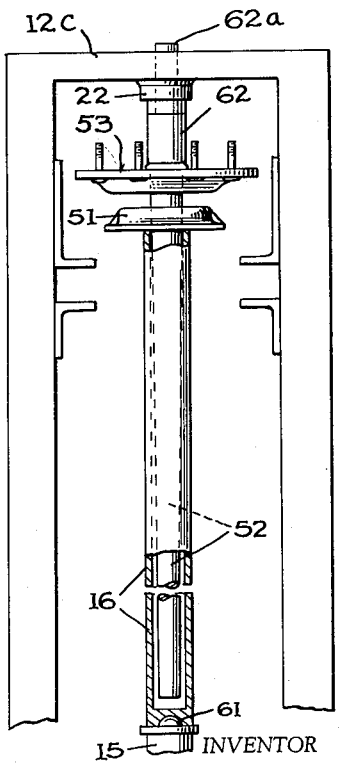

In FIGURE 6 is shown still another operation wherein a bearing 51 is being installed on an axle 52. Pulling plates 18 have been removed from the press and pusher tube 16 is being used in this operation. Also used here is a detachable anvil 62 having a stem portion 62a fitting into the bore of anvil 22 which is welded to frame 12. Axle 52 is fitted into the hollow bore 31 of pusher tube 16. The opposite end of axle 52 is held against anvil 62. The operation of jack ram 15 forces pusher tube 16 upward against bearing 51. Since the opposite end of axle 52 is braced against anvil 62, any movement of axle 52 is prevented and therefore bearing 51 is forced up along axle 52 to form a press fit of the bearing on the axle.

Many other uses of this invention are possible and the parts illustrated above may be rearranged for other uses. If, for instance, it is desired to remove a bearing from a universal joint it is most expedient to use the device as set up in the illustration in FIGURE 1 with only a slight change. The detachable anvil 62 illustrated in FIGURES 5 and 6 is substituted for guide rod 23. When pushing tool 17 is moved upward pushing the bearing upward and out of the universal joint yoke it pushes this bearing into a central bore 62b provided in the lower end of the detachable anvil 62.

It will thus be apparent that the new apparatus has an advantage of flexibility due to easily removable parts. The pulling plates which engage the upper part of a bearing when the bearing is being removed from the axle are easily removed from the press when the bearing is being replaced on the axle.

A further advantage conducive to flexibility is the adjustability of the pulling plates to serve to support a pilot ring or rods of different diameters.

Additional embodiments of the invention will occur to others and therefore it is intended that the scope of the invention be limited only by the appended claims and not by the embodiments described hereinabove.

What is claimed is:

1. A device for operating on press-fitted parts comprising in combination: an elongated supporting frame; lifting means mounted at one end of said supporting frame and having a ram movable parallel with the longitudinal axis of said frame; a tubular pushing element having one end thereof engaging the head of said ram and comprising an extension of said lifting means, cooperating parts on said ram and said tubular pushing element to prevent lateral movement of said tubular element with respect to said ram; an apertured anvil rigidly mounted on said supporting frame in a position to oppose the action of said ram operating through said tubular element on a workpiece seated on said anvil, said aperture passing entirely through said anvil and being axially aligned with the axis of said ram; and a guide rod passing through said aperture and having an end portion extending through said workpiece and into the other end of said tubular pushing element, whereby said tubular element is guided at both ends for movement along the axis of said ram, said guide rod being slidable in the aperture of said anvil and being removable from the rear end of said aperture.

2. A device for operating on press-fitted parts comprising in combination: an upright elongated supporting frame; a lifting jack mounted at the lower end of said supporting frame and having a ram movable parallel with the longitudinal axis of said frame; said supporting frame comprising at least two vertical and parallel tension members rigidly secured at their ends to two cross members, an anvil fixed to the upper cross-member on the axis of said ram, a pair of spaced guide members rigidly attached to the inner face of each tension member transversely thereof to provide two opposed horizontal guide channels arranged transversely of said tension members and adjacent said anvil; and a pair of complemental pulling plate members mounted in edge-to-edge relation with their ends located in said opposed guide channels, said pulling plates being located on opposite sides of the ram axis and having their adjacent edges notched at the location of said ram axis to provide an aperture through which an elongated pushing part carried by said ram may pass through the common plane of said pulling plates and extend upwardly towards said anvil, means for clamping said complemental plate members together in adjustable spaced relation to accommodate different sizes of pushing parts to pass through said aperture, said pulling plates being securely held in said channels to form a fixed stop for parts carried by said elongated pushing part whereby press-fitted parts may be separated from each other.

3. A device according to claim 2 wherein said supporting frame is open at the front and back sides adjacent said pulling plates, and including two rigid metallic guard plates removably attached to said complemental pulling plates, on opposite sides of said aperture, said guard plates extending from said pulling plates in a direction to provide shields at the front and back of said frame for parts carried by said pushing part being subject to breakage.

4. A device according to claim 2 and including a pilot ring located within the aperture formed in the adjacent edges of said pulling plates and being clamped between said pulling plates with the center of the ring located on the axis of said ram, said ring serving as a pilot for guiding an elongated pushing part carried by said ram.

References Cited in the file of this patent
UNITED STATES PATENTS

| | | |
|---|---|---|
| 1,377,469 | Erickson | May 10, 1921 |
| 1,448,868 | Rollins | Mar. 20, 1923 |
| 1,459,269 | Ullman | June 19, 1923 |
| 1,533,560 | Linder | Apr. 14, 1925 |
| 1,565,776 | Benedict | Dec. 15, 1925 |
| 1,736,529 | Goeller | Nov. 19, 1929 |
| 1,810,884 | Minor | June 16, 1931 |
| 1,981,925 | Russell et al. | Nov. 27, 1934 |
| 2,234,819 | Butcher | Mar. 11, 1941 |
| 2,485,022 | Taylor | Oct. 18, 1949 |
| 2,549,429 | Cowels | Apr. 17, 1951 |
| 2,655,067 | Bechler | Oct. 13, 1953 |
| 2,807,080 | Mathews | Sept. 24, 1957 |
| 2,887,768 | Sunnen | May 26, 1959 |

FOREIGN PATENTS

| | | |
|---|---|---|
| 1,060,277 | France | Nov. 18, 1953 |

OTHER REFERENCES

Blackhawk Service Manual No. 239P, published by Blackhawk Manufacturing Company, Milwaukee, Wisconsin, pages 4, 5; page 27 (Fig. 89), 33; catalog received October 1940.